United States Patent
Hatakeyama

(10) Patent No.: US 8,213,450 B2
(45) Date of Patent: Jul. 3, 2012

(54) COMMUNICATION APPARATUS

(75) Inventor: Hideyuki Hatakeyama, Fukushima (JP)

(73) Assignee: Alpine Electronics, Inc., Tokyo (JP)

( * ) Notice: Subject to any disclaimer, the term of this patent is extended or adjusted under 35 U.S.C. 154(b) by 331 days.

(21) Appl. No.: 12/730,030

(22) Filed: Mar. 23, 2010

(65) Prior Publication Data

US 2011/0026542 A1    Feb. 3, 2011

(30) Foreign Application Priority Data

Jul. 29, 2009  (JP) ................. 2009-176407

(51) Int. Cl.
*H04L 12/28* (2006.01)

(52) U.S. Cl. ........................................ 370/431
(58) Field of Classification Search .............. None
See application file for complete search history.

(56) References Cited

U.S. PATENT DOCUMENTS

| | | | |
|---|---|---|---|
| 6,834,316 B1 | 12/2004 | Ishida et al. | |
| 2001/0026557 A1* | 10/2001 | Gaedeken et al. | 370/442 |
| 2001/0044861 A1* | 11/2001 | Niwa et al. | 710/22 |
| 2001/0044866 A1* | 11/2001 | Smyers et al. | 710/126 |
| 2007/0168594 A1* | 7/2007 | Mitsubayashi et al. | 710/311 |

FOREIGN PATENT DOCUMENTS

JP      10-285223      10/1998

* cited by examiner

*Primary Examiner* — Gregory Sefcheck
*Assistant Examiner* — Amar Persaud
(74) *Attorney, Agent, or Firm* — Brinks Hofer Gilson & Lione

(57) ABSTRACT

A CR/CMP layer sets up isochronous channels, the number of which is that of data streams to be transferred, and sets channel numbers associated with the isochronous channels in IT packet processing units of IT processing units of bus control LSI units connected to data streams of AV devices. The IT processing units of the bus control LSI units are caused to perform transmission/reception of isochronous packets using isochronous channels having the set channel numbers. The IT packet processing unit of the IT processing unit of each stealth bus control LSI unit sets, in an SID field of the CIP header of an isochronous packet to be transmitted, the node ID of the representative bus control LSI unit instead of its own node ID.

4 Claims, 3 Drawing Sheets

COMMUNICATION APPARATUS

RELATED APPLICATIONS

The present application claims priority to Japanese Patent Application Serial Number 2009-176407, filed Jul. 29, 2009, the entirety of which is hereby incorporated by reference.

BACKGROUND OF THE INVENTION

1. Field of the Invention

The present invention relates to a technology for using a plurality of communication chips performing isochronous transfer to increase a number of isochronous stream transfers.

2. Description of the Related Art

The IEEE 1394 standard specifies a communication protocol including a physical layer for performing signal input/output from/to a bus, a data link layer for performing isochronous transfer and asynchronous transfer using the physical layer, and a transaction layer for performing upper-layer data transfer using the asynchronous transfer of the data link layer.

A communication chip for IEEE 1394 in charge of the processing for the physical and data link layers is known (see, for example, Japanese Unexamined Patent Application Publication No. 10-285223).

A communication chip such as the chip described above has restrictions on a number of isochronous stream transfers which can simultaneously be preformed. One way to increase the number of simultaneous isochronous stream transfers is to use a plurality of communication chips. However, this causes a problem in that since each of the node IDs, which are the IDs of respective devices in the network, is assigned to a physical layer implemented in each of the communication chips, isochronous transfers using a plurality of communication chips are unfavorably recognized as independent transfers performed by different nodes corresponding to the different communication chips. In addition, various processes at layers above the data link layer required for isochronous transfer need to be performed for each node ID.

SUMMARY OF THE INVENTION

Accordingly, it is an object of the present invention to utilize a plurality of communication chips provided with physical layers and data link layers to increase a number of isochronous stream transfers that a single node can simultaneously perform.

To solve the above described problems, a communication apparatus that performs isochronous transfer of isochronous packets using a set isochronous channel, and that is provided with a plurality of communication chips each assigned a unique node ID, may include: a channel setting unit that sets up and respectively assigns a plurality of isochronous channels to the plurality of communication chips; and a control unit that causes the plurality of isochronous channels to perform isochronous transfer of isochronous packets that indicate, as a node ID, the node ID that has been assigned to one of the plurality of the isochronous channels.

More specifically, a communication apparatus provided with a plurality of communication chips each of which includes a physical layer conforming to the IEEE 1394 standard and a data link layer conforming to the IEEE 1394 standard, the apparatus may include: a transaction layer conforming to the IEEE 1394 standard; a PCR/CMP layer conforming to the IEC 61883 standard, wherein the PCR/CMP layer sets up a plurality of isochronous channels between the communication apparatus and another communication apparatus using the transaction layer and sets up an asynchronous transfer using a representative communication chip of the communication chips, and wherein the PCR/CMP layer sets the set up the isochronous channels, respectively, in the communication chips; and a control unit for causing the communication chips of the plurality of communication chips other than the representative communication chip to transmit an isochronous packet indicating, as a node ID of a transmission source node, the node ID assigned to the representative communication chip instead of a node ID assigned to the communication chip itself. In this case it is preferable that a configuration ROM of the representative communication chip store data, in general ROM format, indicating various attributes of the communication apparatus, the various attributes including an upper protocol configuration, and a configuration ROM of each of the communication chips of the plurality of communication chips other than the representative communication chip stores only data, in minimal ROM format, indicating a manufacturer ID.

According to implementations of the communication apparatus described above, all isochronous transfers performed by respective communication chips can be performed as isochronous transfers performed by nodes having the ID of the representative communication chip, whereby the number of isochronous stream transfers simultaneously performed by a single node can be increased by using a plurality of the communication chips.

In addition, when the communication chips other than the representative communication chip are only used for increasing the number of isochronous stream transfers, layers above and including the transaction layers need not be provided in the communication chips other than the representative communication chip.

Accordingly, as described above, the number of isochronous stream transfers a single node may simultaneously perform can be increased by using a plurality of communication chips provided with a physical link layer and a data link layer.

DETAILED DESCRIPTION OF THE INVENTION

Figure 1:
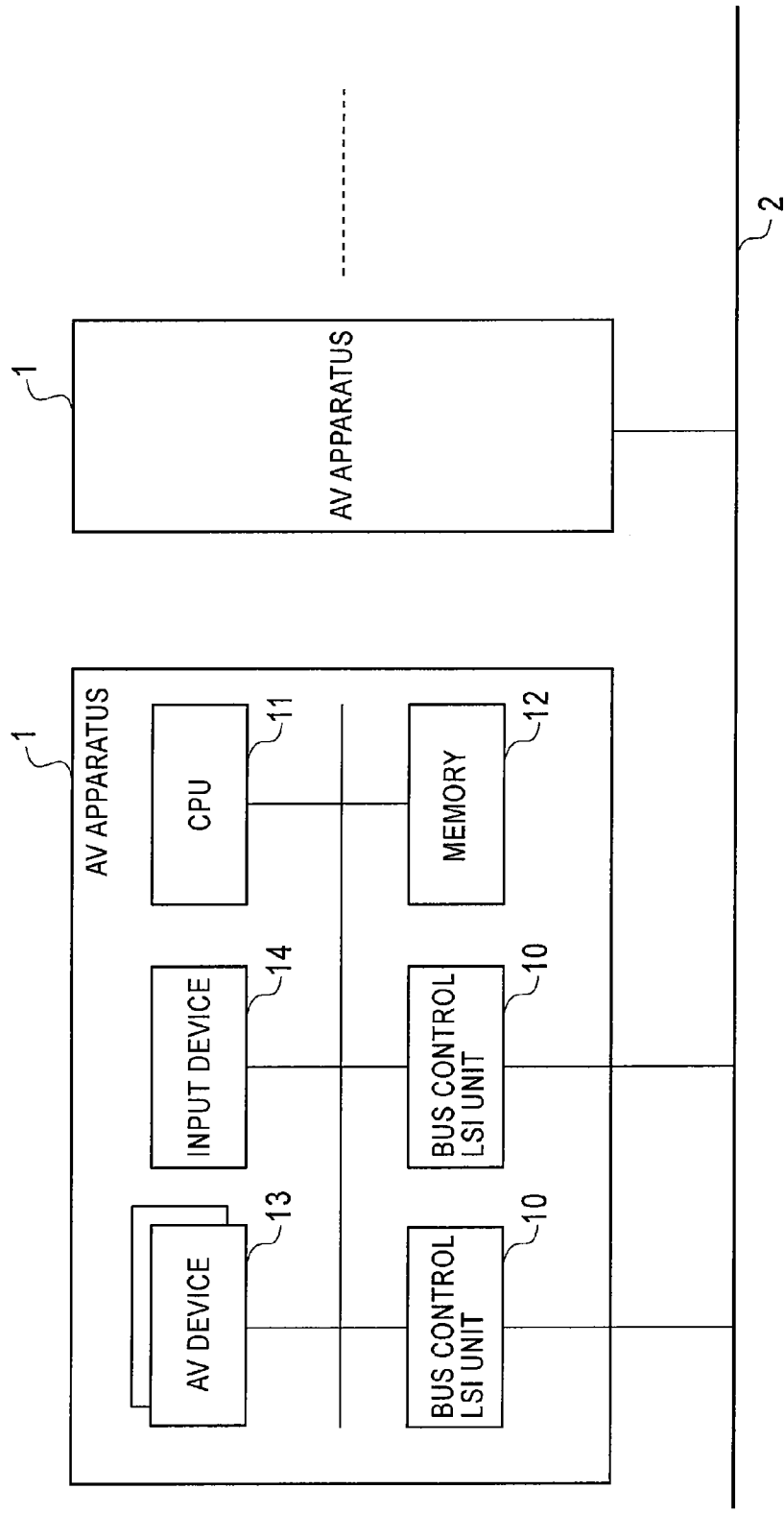
FIG. 1 is a block diagram illustrating a configuration of an AV system.

FIG. 1 illustrates one implementation of an AV system configuration. Referring to FIG. 1, the AV system includes a plurality of AV apparatuses 1 connected by a bus 2 conforming to the IEEE 1394 standard. Each of the AV apparatus 1 includes a plurality of bus control LSI units 10, which are communication chips; a CPU 11, functioning as a control unit; a memory 12; AV devices 13; and an input device 14. The AV device 13 is a device that performs input/output of at least one of audio and video data, such as a display, an audio player, a video player, a television, a radio receiver, or an audio output device.

Figure 2:
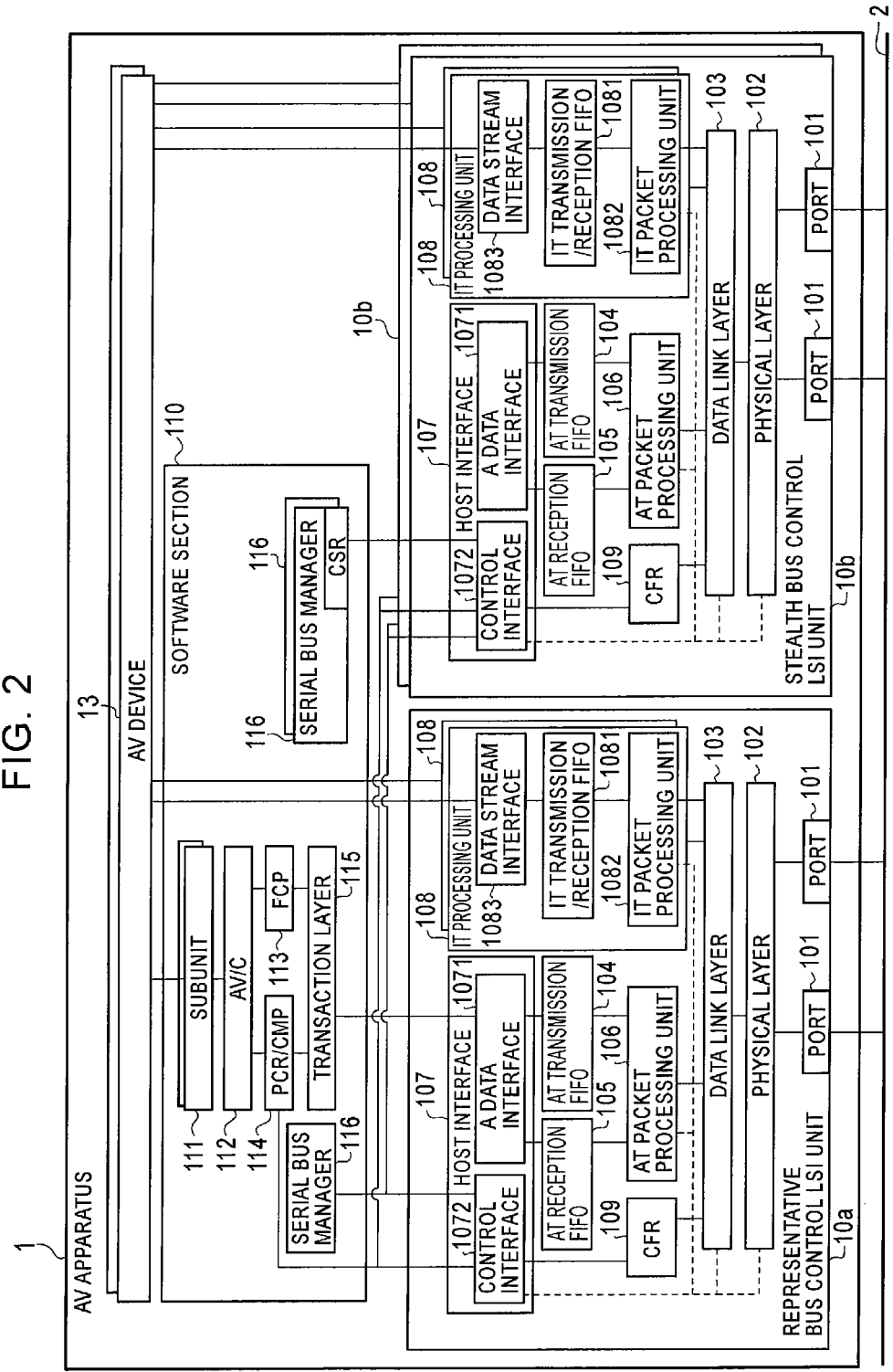
FIG. 2 is a block diagram illustrating a functional configuration of a AV system.

FIG. 2 illustrates a functional configuration of the AV apparatus 1. Respective functions within a software section 110, functioning as a control unit, illustrated in FIG. 2 are functions realized by causing the CPU 11 to execute a program stored in the memory 12.

Referring to FIG. 2, one of the bus control LSI units 10 is used as a representative bus control LSI unit 10*a*, and the others are used as stealth bus control LSI units 10*b*. The bus control LSI units 10 have the same configuration, and each include two ports 101 connected to the bus 2, a physical layer 102, conforming to the IEEE 1394 standard, performing signal input/output from/to the bus 2 through the ports 101, and a data link layer 103, conforming to the IEEE 1394 standard, that performs isochronous transfer and asynchronous transfer using the physical layer 102.

The bus control LSI unit 10 includes an AT transmission FIFO 104 for storing data to be transmitted by asynchronous transfer, an AT reception FIFO 105 for storing data received by asynchronous transfer, an AT packet processing unit 106 for controlling data input/output in units of asynchronous transfers sent or received by asynchronous transfer at the data link layer 103 between the data link layer 103 and the AT transmission FIFO 104 or the AT reception FIFO 105, a host interface 107, one or more IT processing units 108, and a configuration ROM (CFR) 109.

The host interface 107 includes an A data interface 1071 for controlling input/output of data between the software section 110 and the AT transmission FIFO 104 or the AT reception FIFO 105, and a control interface 1072 for processing input/output of various data from/to respective functions of the software section 110.

Each IT processing unit 108 includes an IT transmission/reception FIFO 1081, an IT packet processing unit 1082, and a data stream interface 1083. The IT transmission/reception FIFO 1081 stores data transmitted or received by isochronous transfer. The IT packet processing unit 1082 controls input/output of data sent or received by isochronous transfer in units of isochronous packets at the data link layer 103 between the data link layer 103 and the IT transmission/reception FIFO 1081. The IT packet processing unit 1082 also controls packeting and depacketing as well as transmission/reception of isochronous packets. The data stream interface 1083 processes video and audio streams input to or output by the AV apparatus 1, and processes data input from or output to the IT transmission/reception FIFO 1081.

The software section 110 includes subunits 111 for controlling the AV devices 13, an AV/C layer 112, an FCP layer 113, a PCR/CMP layer 114, a transaction layer 115 conforming to the IEEE 1394 standard, and a serial bus manager 116 provided for each of the bus control LSI units 10. The AV/C layer 112, which conforms to the AV/C standard defined by the 1394 Trade Association, provides a control interface 1072 between the subunits 111 and other AV apparatuses 1. The FCP layer 113, which conforms to the IEC 61883-1 standard, provides a data transmission/reception protocol for the AV/C layer 112. The PCR/CMP layer 114, which conforms to the IEC 61883 standard and functions as a channel setting unit, sets and manages isochronous channels, which are channels for isochronous transfer.

The CFR 109 provided in each of the bus control LSI units 10 stores data describing various types of attribute information such as the manufacturer ID of the node, the capabilities of the node, and the upper layer protocol configuration supported by the node. Each node can obtain the various types of attribute information regarding other nodes by reading the CFRs 109 thereof.

In some implementations, the CFR 109 of the representative bus control LSI unit 10a of the AV apparatus 1 stores, in general ROM format, the various types of attribute information regarding the AV apparatus 1 described above; however, the CFRs 109 of the stealth bus control LSI units 10b store only the manufacture IDs in minimal ROM format. Thereby, the stealth bus control LSI units 10b are recognized by other nodes as nodes having no upper protocol, and are ignored in various processes performed by the upper protocols in the AV system.

The representative bus control LSI unit 10, using asynchronous transfer, performs the AV apparatus 1 communication performed by all of the upper protocols (the subunit 111, the AV/C layer 112, the FCP layer 113, the PCR/CMP layer 114, and the transaction layer 115).

The serial bus manager 116 provided for each of the bus control LSI units 10 is responsible for the management of bus control functions regarding each node. However, the serial bus managers 116 corresponding to the stealth bus control LSI units 10b need not have functions required for an asynchronous capable node, and need only to have CSR required for an isochronous capable node.

In the configuration described above, isochronous transfer is used for the transfer of data streams such as audio and video among the AV devices 13.

The procedure for this isochronous transfer is described below. First, when a bus initialization procedure performed upon a connection of a new device to the bus assigns a node ID to the representative bus control LSI unit 10a, the serial bus manager 116 of the representative bus control LSI unit 10a sets, as a representative node ID, the node ID assigned to the representative bus control LSI unit 10a, in the IT packet processing units 1082 of the stealth bus control LSI units 10b.

Next, when the transfer of data streams is started, the PCR/CMP layer 114 of the AV apparatus 1 has predetermined sessions with an IRM, conforming to IEEE 1394, that manages the resources of the bus or with the PCR/CMP layers 114 of other AV apparatuses 1, using asynchronous transfer of asynchronous packets via the transaction layer 115 and the AT processing unit of the representative bus control LSI unit 10a. Then, the PCR/CMP layer 114 sets up a plurality of isochronous channels used for transferring the data streams, where the number of the isochronous channels is the same as that of the data streams.

The channel numbers of isochronous channels which have been set up for data streams connected to the IT processing units 108 are set in the respective IT packet processing units 1082 of the IT processing units 108 of the bus control LSI units 10, where the data stream interface units 1083 of the bus control LSI units 10 have been connected to the target input/output data streams of the AV devices 13.

The AV devices 13 are caused to start input/output from/to the bus control LSI units 10, and the IT processing units 108 of the bus control LSI units 10 are caused to perform transmission/reception of isochronous packets using isochronous channels having the set channel numbers.

Figure 3:
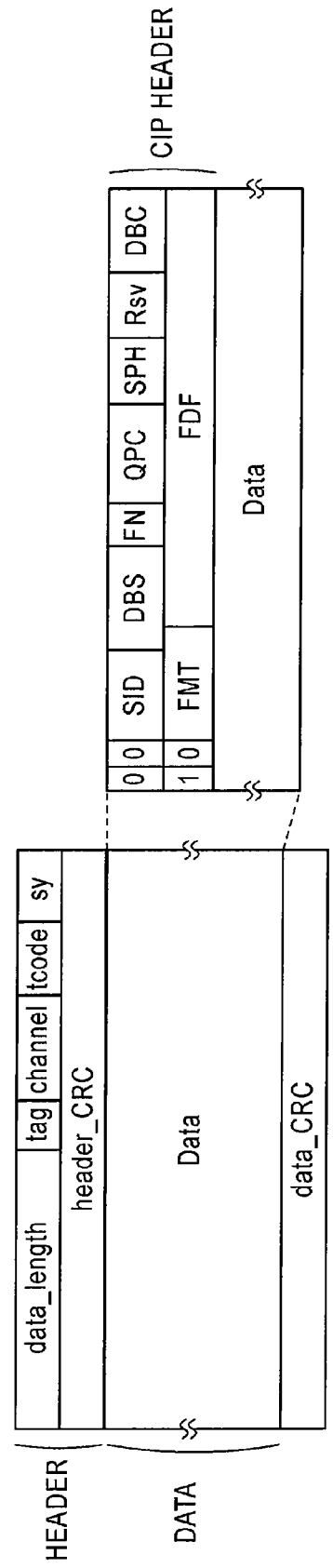
FIG. 3 illustrates an isochronous packet.

FIG. 3 illustrates the configuration of an isochronous packet which is transmitted using isochronous transfer. Referring to FIG. 3, the isochronous packet includes a header, data, and a data_CRC, which is an error detection code. The header includes a 16-bit "data_length" field indicating the length of an isochronous packet, a "tag" field used for identification of a packet data format, a "channel" field indicating the channel number of isochronous channels, a "tcode" field indicating the types of transaction, and an "sy" field used for data synchronization. The "data" field includes data of a data stream with a common isochronous protocol (CIP) header attached thereto.

The CIP header includes an SID field indicating the node of a transmission source of the isochronous packet, a DBS field indicating a data block size, an FN field indicating how a source packet has been divided into data blocks or that the source packet has not been divided, a QPC field indicating the number of bytes which have been added to the source packet to adjust the size of the source packet for division, an SPH filed indicating whether or not the source packet has a header based on the types of data, a DBC filed which is a counter for determining the continuity of data blocks, an FMT field indicating the types of data being transmitted, and an FDF field containing parameters required for each type of data.

In the transmission/reception of the above described packets, the IT packet processing unit 1082 of each of the IT processing units 108 transmits or receives isochronous packets whose headers include the channel number in the "channel" fields thereof set by the PCR/CMP layer 114. In other words, for transmission of isochronous packets, for example, the IT packet processing unit 1082 sets the channel number set by the PCR/CMP layer 114 in the "channel" field of the header of each isochronous packet to be transmitted.

The IT packet processing unit 1082 of the IT processing unit 108 of the stealth bus control LSI unit 10b sets, in the SID fields of the CIP headers of isochronous packets to be transmitted, the representative node ID which has been set by the serial bus manager 116 of the representative bus control LSI unit 10a instead of its own node ID. Note that the IT packet processing unit 1082 of the IT processing unit 108 of the representative bus control LSI unit 10a, as usual, sets its own node ID in the SID fields of the CIP headers of isochronous packets to be transmitted.

Hence, all isochronous packets transmitted from the representative bus control LSI unit 10a and the stealth bus control LSI units 10b are made to have the same node ID in the SID fields. Thereby, all isochronous packets transmitted from the representative bus control LSI unit 10a and the stealth bus control LSI units 10b are recognized by the reception sides as packets transmitted from a single node.

Note that in the AV apparatuses 1 described above, when isochronous channels are to be secured, a DTCP layer executing an authentication procedure and encryption/decryption key setting procedure in accordance with DTCP is provided as an upper layer of the AV/C layer 112. At the DTCP layer, device authentication and encryption/decryption key generation in accordance with the AKE procedure are performed between the DTCP layer and the PCR/CMP layer 114 of the AV apparatus 1, which is the isochronous transfer counterpart, using asynchronous transfer of asynchronous packets via the AV/C layer 112, the FCP layer 113, the transaction layer 115, and the AT processing unit of the representative bus control LSI unit 10a. The generated encryption/decryption key is set in the bus control LSI units 10, whereby data to be transmitted is caused to be encrypted and decrypted by using isochronous packets using the encryption/decryption key which has been set in the bus control LSI units 10. This allows isochronous transfer performed by the bus control LSI units 10 to be secured without securing processing for isochronous packets in each of the bus control LSI units 10.

In some implementations, as described above, the node ID of the representative bus control LSI unit 10a is set as the node ID of a transmission source in all the isochronous packets transmitted from the bus control LSI units 10, whereby the number of isochronous stream transfers performed by a single node can be increased by using a plurality of the bus control LSI units 10.

It is intended that the foregoing detailed description be regarded as illustrative rather than limiting, and that it be understood that it is the following claims, including all equivalents, that are intended to define the spirit and scope of this invention.

What is claimed is:

1. A communication apparatus that performs isochronous transfer of isochronous packets using a set isochronous channel, the communication apparatus comprising:
    a plurality of communication chips each assigned a unique node ID and including a physical layer and a data link layer, each of which confirm to the IEEE 1394 standard;
    a channel setting unit conforming to the IEC 61883 standard, the channel setting unit configured to set up a plurality of isochronous channels between the communication apparatus and a second communication apparatus, and to set UP an asynchronous transfer using a first communication chip of the plurality of communication chips, wherein the channel setting unit sets up the plurality of isochronous channels, respectively, in the plurality of communication chips; and
    a control unit that causes the plurality of isochronous channels to perform isochronous transfer of isochronous packets that indicate a node ID of a transmission source node that is assigned to the first communication chip instead of a node ID assigned to the communication chip itself.

2. A communication apparatus comprising:
    a plurality of communication chips each of which includes a physical layer conforming to the IEEE 1394 standard and a data link layer conforming to the IEEE 1394 standard;
    a transaction layer conforming to the IEEE 1394 standard;
    a PCR/CMP layer conforming to the IEC 61883 standard, wherein the PCR/CMP layer sets up a plurality of isochronous channels between the communication apparatus and a second communication apparatus using the transaction layer, and sets up an asynchronous transfer using a first communication chip of the plurality of communication chips, wherein the PCR/CMP layer sets up the plurality of isochronous channels, respectively, in the plurality of communication chips; and
    a control unit for causing each of the communication chips of the plurality of communication chips other than the first communication chip to transmit isochronous packets indicating a node ID of a transmission source node that is assigned to the first communication chip instead of a node ID assigned to the communication chip itself.

3. The communication apparatus of claim 2, wherein each of the communication chips comprises a configuration ROM conforming to the IEEE 1394 standard, and
    wherein the configuration ROM of the first communication chip stores data, in general ROM format, indicating various attributes of the communication apparatus, the various attributes comprising an upper protocol configuration, and a configuration ROM of each of the communication chips of the plurality of communication chips other than the first communication chip stores only data, in minimal ROM format, indicating a manufacturer ID.

4. A computer program stored in a computer-readable non-transitory storage medium that is configured to be read and executed by a computer comprising a processor and a plurality of communication chips, each chip including a physical layer and a data link layer conforming to the IEEE 1394 standard, wherein the computer performs isochronous transfer of isochronous packets using a set isochronous channel and each communication chip of the plurality of communication chips is assigned a unique node ID, wherein the computer program causes the computer to function as:
a channel setting unit conforming to the IEC 61883 standard that sets up a plurality of isochronous channels between the computer and a second computer, and sets up an asynchronous transfer using a first communication chip of the plurality of communication chips, wherein the channel setting unit sets UP the plurality of isochronous channels, respectively, in the plurality of communication chips;

a control unit that causes the plurality of the isochronous channels to perform isochronous transfer of isochronous packets that indicate a node ID of a transmission source node that is assigned to the first communication chip instead of the node ID assigned to the communication chip itself.

* * * * *